(12) United States Patent
Russell et al.

(10) Patent No.: US 12,181,886 B2
(45) Date of Patent: *Dec. 31, 2024

(54) CONTROLLING VEHICLES THROUGH MULTI-LANE TURNS

(71) Applicant: Waymo LLC, Mountain View, CA (US)

(72) Inventors: Jared Stephen Russell, San Francisco, CA (US); Jens-Steffen Ralf Gutmann, Cupertino, CA (US); Pei Sun, Palo Alto, CA (US)

(73) Assignee: Waymo LLC, Mountain View, CA (US)

( * ) Notice: Subject to any disclaimer, the term of this patent is extended or adjusted under 35 U.S.C. 154(b) by 393 days.

This patent is subject to a terminal disclaimer.

(21) Appl. No.: 17/336,938

(22) Filed: Jun. 2, 2021

(65) Prior Publication Data

US 2021/0341934 A1    Nov. 4, 2021

Related U.S. Application Data

(63) Continuation of application No. 16/165,114, filed on Oct. 19, 2018, now Pat. No. 11,054,834.

(51) Int. Cl.
*G05D 1/00* (2024.01)
*B60W 30/18* (2012.01)

(52) U.S. Cl.
CPC ......... *G05D 1/0221* (2013.01); *G05D 1/0088* (2013.01); *G05D 1/0231* (2013.01);
(Continued)

(58) Field of Classification Search
CPC .. G05D 1/0221; G05D 1/0088; G05D 1/0231; G05D 1/0274; G05D 2201/0213;
(Continued)

(56) References Cited

U.S. PATENT DOCUMENTS

| | | | |
|---|---|---|---|
| 9,694,813 | B2 | 7/2017 | Toyoda |
| 9,910,443 | B1 | 3/2018 | Lee et al. |

(Continued)

FOREIGN PATENT DOCUMENTS

| | | |
|---|---|---|
| CA | 3036160 A1 | 3/2018 |
| CN | 107380161 A | 11/2017 |

(Continued)

OTHER PUBLICATIONS

English Translation for refrence WO-2017116073, 2017.*

(Continued)

*Primary Examiner* — Rachid Bendidi
(74) *Attorney, Agent, or Firm* — Botos Churchill IP Law

(57) ABSTRACT

The technology relates controlling an autonomous vehicle through a multi-lane turn. In one example, data corresponding to a position of the autonomous vehicle in a lane of the multi-lane turn, a trajectory of the autonomous vehicle, and data corresponding to positions of objects in a vicinity of the autonomous vehicle may be received. A determination of whether the autonomous vehicle is positioned as a first vehicle in the lane or positioned behind another vehicle in the lane may be made based on a position of the autonomous vehicle in the lane relative to the positions of the objects. The trajectory of the autonomous vehicle through the lane may be adjusted based on whether the autonomous vehicle is positioned as a first vehicle in the lane or positioned behind another vehicle in the lane. The autonomous vehicle may be controlled based on the adjusted trajectory.

18 Claims, 13 Drawing Sheets

(52) U.S. Cl.
CPC ... *B60W 30/18145* (2013.01); *B60W 2400/00* (2013.01); *B60W 2420/403* (2013.01); *B60W 2555/60* (2020.02); *B60W 2720/24* (2013.01); *G05D 1/0274* (2013.01)

(58) Field of Classification Search
CPC ....... B60W 30/18145; B60W 2400/00; B60W 2420/42; B60W 2555/60; B60W 2720/24; B60W 30/165; B60W 60/0011; B60W 2420/52; B60W 2520/10; B60W 2552/05; B60W 2552/53; B60W 2556/10; B60W 2556/50; B60W 60/00; B60W 30/18159; B60W 30/14; B60W 40/02; B60W 2520/06; B60Y 2300/14
See application file for complete search history.

(56) References Cited

U.S. PATENT DOCUMENTS

| | | | |
|---|---|---|---|
| 10,661,803 | B2 | 5/2020 | Shimakage |
| 2005/0228588 | A1* | 10/2005 | Braeuchle ............ B62D 15/025 701/301 |
| 2015/0346723 | A1 | 12/2015 | Pedersen |
| 2015/0353085 | A1 | 12/2015 | Lee |
| 2016/0039459 | A1 | 2/2016 | Spero et al. |
| 2016/0052547 | A1 | 2/2016 | Kashiwai |
| 2016/0176398 | A1 | 6/2016 | Prokhorov et al. |
| 2017/0057496 | A1 | 3/2017 | Toyoda |
| 2018/0011497 | A1 | 1/2018 | Schroeder et al. |
| 2018/0082589 | A1 | 3/2018 | Park et al. |
| 2018/0099667 | A1 | 4/2018 | Abe et al. |
| 2018/0120859 | A1 | 5/2018 | Eagelberg et al. |
| 2018/0150080 | A1 | 5/2018 | Gross et al. |
| 2018/0237066 | A1 | 8/2018 | Kawashima et al. |
| 2018/0299290 | A1 | 10/2018 | Slavin et al. |
| 2019/0071093 | A1 | 3/2019 | Ma et al. |
| 2019/0295419 | A1 | 9/2019 | Tosa et al. |
| 2020/0282997 | A1* | 9/2020 | Ueda ............... B60W 30/18163 |

FOREIGN PATENT DOCUMENTS

| | | | | |
|---|---|---|---|---|
| JP | 2003099896 | A | | 4/2003 |
| JP | 2004078333 | A | | 3/2004 |
| JP | 2004206275 | A | | 7/2004 |
| JP | 2005242484 | A | | 9/2005 |
| JP | 2009087062 | A | | 4/2009 |
| JP | 2014151838 | A | * | 8/2014 |
| JP | 2015120476 | | * | 2/2015 |
| JP | 2015120476 | A | | 7/2015 |
| JP | 2016224802 | A | | 12/2016 |
| JP | 2018062244 | A | | 4/2018 |
| JP | 2018083587 | A | | 5/2018 |
| JP | 2018134984 | A | | 8/2018 |
| KR | 20170056233 | A | | 5/2017 |
| WO | WO-2017116073 | A1 | * | 7/2017 ............... B60Q 1/52 |

OTHER PUBLICATIONS

English Translation for refrence JP2015120476, 2015.*
English translation for JP2014-151838 (Year: 2014).*
1 Notice of Reasons for Rejection for Japanese Patent Application No. 2021-518953, Jun. 8, 2022.
English Translation for reference JP2015120476 (Year: 2015).
"International Search Report and Written Opinion for Application No. PCT/US2019/055578 dated Jan. 31, 2020", 8 pages.
Chinese Decision to Grant with Search Report for Application No. CN201980076168.1 dated Oct. 20, 2021.
Notice of Preliminary Rejection for Korean Patent Application No. 10-2021-7014725, Jun. 2, 2022.
The Extended European Search Report for European Patent Application No. 19873691.0, May 18, 2022.
Notice of Last Preliminary Rejection for Korean Patent Application No. 10-2021-7014725, Dec. 12, 2022.
Notice of Allowance for Korean Patent Application No. 10-2021-7014725, Oct. 5, 2023, 7 Pages.
Office Action for Japanese Patent Application No. 2023-065302, Feb. 13, 2024, 12 Pages.
The Third Office Action for Chinese Patent Application No. 202111663341.3, Oct. 15, 2024, 25 Pages.

* cited by examiner

CONTROLLING VEHICLES THROUGH MULTI-LANE TURNS

CROSS REFERENCE TO RELATED APPLICATIONS

The present application is a continuation of U.S. patent application Ser. No. 16/165,114, filed Oct. 19, 2018, the entire disclosure of which is incorporated herein by reference.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pickup or destination location, and the autonomous vehicle maneuvers itself to that location. In order to do so safely, these vehicles must be able to detect and identify objects in the environment as well as respond to them quickly. Typically, these objects are identified from information that can be perceived by sensors such as LIDAR, radar, or cameras.

In some instances, detection and identification of other vehicles in the vicinity of the autonomous vehicle is paramount to safely maneuvering the autonomous vehicle to its destination. For instance, an autonomous vehicle's trajectory may be impacted by the actions of other vehicle's traveling around the autonomous vehicle. Therefore being able to detect and respond to such action can be especially important to ensuring a safe and effective autonomous driving experience.

BRIEF SUMMARY

This technology generally relates to a method for controlling an autonomous vehicle through a multi-lane turn. The method may comprise receiving, by one or more processors, data corresponding to a position of the autonomous vehicle in a lane of the multi-lane turn and a trajectory of the autonomous vehicle; receiving, by the one or more processors, data corresponding to positions of objects in a vicinity of the autonomous vehicle; determining based on a position of the autonomous vehicle in the lane relative to the positions of the objects, whether the autonomous vehicle is positioned as a first vehicle in the lane or positioned behind another vehicle in the lane; adjusting, based on whether the autonomous vehicle is positioned as a first vehicle in the lane or positioned behind another vehicle in the lane, by one or more processors, the trajectory of the autonomous vehicle through the lane; and controlling the autonomous vehicle through the multi-lane turn based on the adjusted trajectory.

In some embodiments, upon determining the position of the autonomous vehicle is positioned as the first vehicle in the lane, the trajectory may be adjusted based on historical data corresponding to previous trajectories of one or more vehicles which traversed the lane. In some examples, the historical data may correspond to previous trajectories of the autonomous vehicle. In some instances, adjusting the trajectory based on the historical data may comprise determining an average, lateral displacement of the previous trajectories relative to the trajectory of the autonomous vehicle; and adjusting the trajectory of the autonomous vehicle by the average, lateral displacement. In some embodiments, the average, lateral displacement may be limited to a predefined distance to a left and right direction of the trajectory.

In some embodiments, upon determining the autonomous vehicle is positioned behind the another vehicle, the trajectory may be adjusted based on a trajectory of the another vehicle. In some examples, the trajectory of the another vehicle may be tracked by imaging sensors on the autonomous vehicle. In some instances, the adjusted trajectory may be bound by a predefined distance to the left and right of the trajectory.

In some embodiments adjusting the trajectory of the autonomous vehicle occurs continuously through the multi-lane turn.

In some embodiments upon determining the autonomous vehicle is positioned behind multiple vehicles, adjusting the trajectory based on trajectories of the multiple vehicles through the multi-lane turn.

Another aspect of the technology relates to a system for controlling an autonomous vehicle through a multi-lane turn, the system comprising: one or more processors, wherein the one or more processors are configured to: receive data corresponding to a position of the autonomous vehicle in a lane of the multi-lane turn; receive data corresponding to positions of objects in a vicinity of the autonomous vehicle; determine, based on a position of the autonomous vehicle in the lane relative to the positions of the objects, whether the autonomous vehicle is positioned as a first vehicle in the lane or positioned behind another vehicle in the lane; adjust, based on whether the autonomous vehicle is positioned as a first vehicle in the lane or positioned behind another vehicle in the lane, by one or more processors, a trajectory of the autonomous vehicle through the lane; and control the autonomous vehicle through the multi-lane turn based on the adjusted trajectory.

In some instances the one or more processors may be further configured to, upon determining the position of the autonomous vehicle is positioned as the first vehicle in the lane, adjust the trajectory based on historical data corresponding to previous trajectories of one or more vehicles which traversed the lane. In some examples, the historical data corresponds to previous trajectories of the autonomous vehicle.

In some instances, adjusting the trajectory based on the historical data comprises: determining an average, lateral displacement of the previous trajectories relative to the trajectory of the autonomous vehicle; and adjusting the trajectory of the autonomous vehicle by the average, lateral displacement. In some examples, the average, lateral displacement may be limited to a predefined distance to a left and right of the trajectory.

In some embodiments, the one or more processors may be further configured to, upon determining the autonomous vehicle is positioned behind the another vehicle, adjust the trajectory based on a trajectory of the another vehicle. In some examples, the trajectory of the another vehicle may be tracked by imaging sensors on the autonomous vehicle. In some instances, the adjusted trajectory may be bound by a predefined distance to the left and right of the trajectory.

In some embodiments, adjusting the trajectory of the autonomous vehicle may occur continuously through the multi-lane turn.

In some embodiments the one or more processors may be further configured to, upon determining the autonomous vehicle is positioned behind multiple vehicles, adjust the trajectory based on trajectories of the multiple vehicles through the multi-lane turn.

DETAILED DESCRIPTION

Overview

Figure 1:
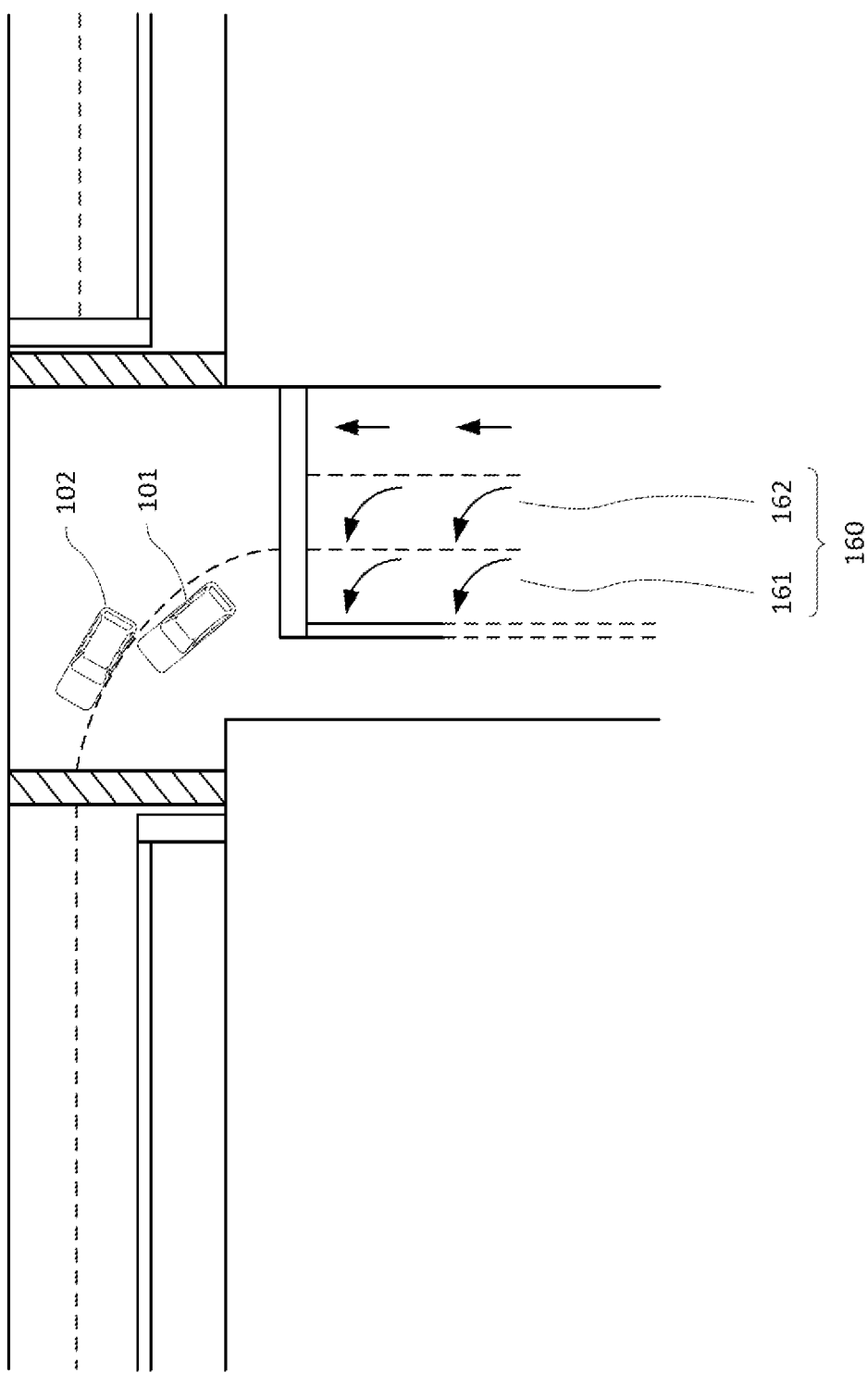
FIG. 1 shows an example roadway in accordance with aspects of the disclosure.

This technology relates to controlling an autonomous vehicle through a multi-lane turn. In this regard, when traversing a multi-lane turn, such as a double or triple lane, left or right hand turn, drivers frequently cut corners and cross lane boundaries. For instance, FIG. 1 shows a portion of roadway 100 on which vehicles 101 and 102 are traversing a double lane left turn 160 in the inside lane 161 and outside lane 162, respectively. The vehicle 102 traversing the outside lane 162 is crossing into the inside lane 161 and into the path of vehicle 101 which is traversing the inside lane 161. To avoid hitting vehicle 102, vehicle 101 may be forced to adjust its trajectory. Vehicles, such as vehicle 101, are commonly cut-off or pushed out of their current trajectory by vehicles traveling in an adjacent lane. These issues are magnified with regard to autonomous vehicles, as autonomous vehicles may be programmed to follow a trajectory within a lane in which the vehicle is positioned. As such, when an autonomous vehicle is "cut-off" or "pinched" by another vehicle in the midst of the autonomous vehicle performing a turn through a multi-lane turn, an evasive action may be required. Such evasive actions may lead to uncomfortable or unsafe conditions for the passengers of the autonomous vehicle.

To address these issues, the actions and trajectory of the autonomous vehicle may be adjusted as it traverses through the multi-lane turn. The trajectory may be adjusted based on the vehicle's position relative to other vehicles or based on historical data of vehicle's traversing the multi-lane turn. In this regard, when traversing a multi-lane turn, the autonomous vehicle may be in a number of positions relative to the other vehicles, such as, for instance the first vehicle in a line of vehicles, the last vehicle in a line of vehicles, or in between vehicles. For instance, when the autonomous vehicle is positioned first in a line of vehicles, the trajectory of the autonomous vehicle may be adjusted such that it may follow an alternate trajectory based on historical data corresponding to previous paths vehicles took through the multi-lane turn. In instances where the autonomous vehicle is positioned in the middle or behind other vehicles, the trajectory of the autonomous vehicle may be adjusted such that it follows the trajectory of vehicles positioned ahead.

The historical data may be comprised of previous paths the autonomous vehicle or other vehicles have traversed around multi-lane turns may be monitored and used to alter the autonomous vehicle's nominal trajectory. Based on this historical data, the alternate trajectory may be followed in lieu of the autonomous vehicle's nominal trajectory to more closely resemble the previous trajectories of vehicles traversing the turn. In some instances, the alternate trajectory may be limited such to prevent the autonomous vehicle from deviating too far outside of a safe operating trajectory.

In instances where vehicles are traversing a lane adjacent to the autonomous vehicle, the autonomous vehicle may adjust its trajectory such that it staggers itself relative to adjacent vehicles to increase its visibility to drivers of the adjacent vehicles. In other words, the autonomous vehicle may continually position itself such that it is between the vehicles of the adjacent lane, such that the vehicles of the adjacent lane can see the autonomous vehicle.

In instances where the autonomous vehicle is unable to maintain a staggered position relative to the vehicles of the adjacent lane, the autonomous vehicle may either pass or yield to one of the surrounding vehicles. The determination whether to pass or yield may be based on passenger comfort levels, such that any maneuvers to pass or yield should not result in undue passenger discomfort.

The features described herein allow for improved and safer travel of an autonomous vehicle through a multi-lane turn. In this regard, the features described herein provide for more comfortable turning conditions for passengers of the autonomous vehicle, as evasive maneuvers, such as hard braking or quick turns may be avoided. Moreover, the autonomous vehicle may be positioned such that it is more visible to surrounding vehicles to reduce the risk of a driver not seeing the autonomous vehicle while traversing the multi-lane turn. In addition, the movements of the autonomous vehicle through a multi-lane turn may be more typical of human drivers, allowing drivers of surrounding vehicles to more easily predict the movements of the autonomous vehicle.

EXAMPLE SYSTEMS

Figure 2:
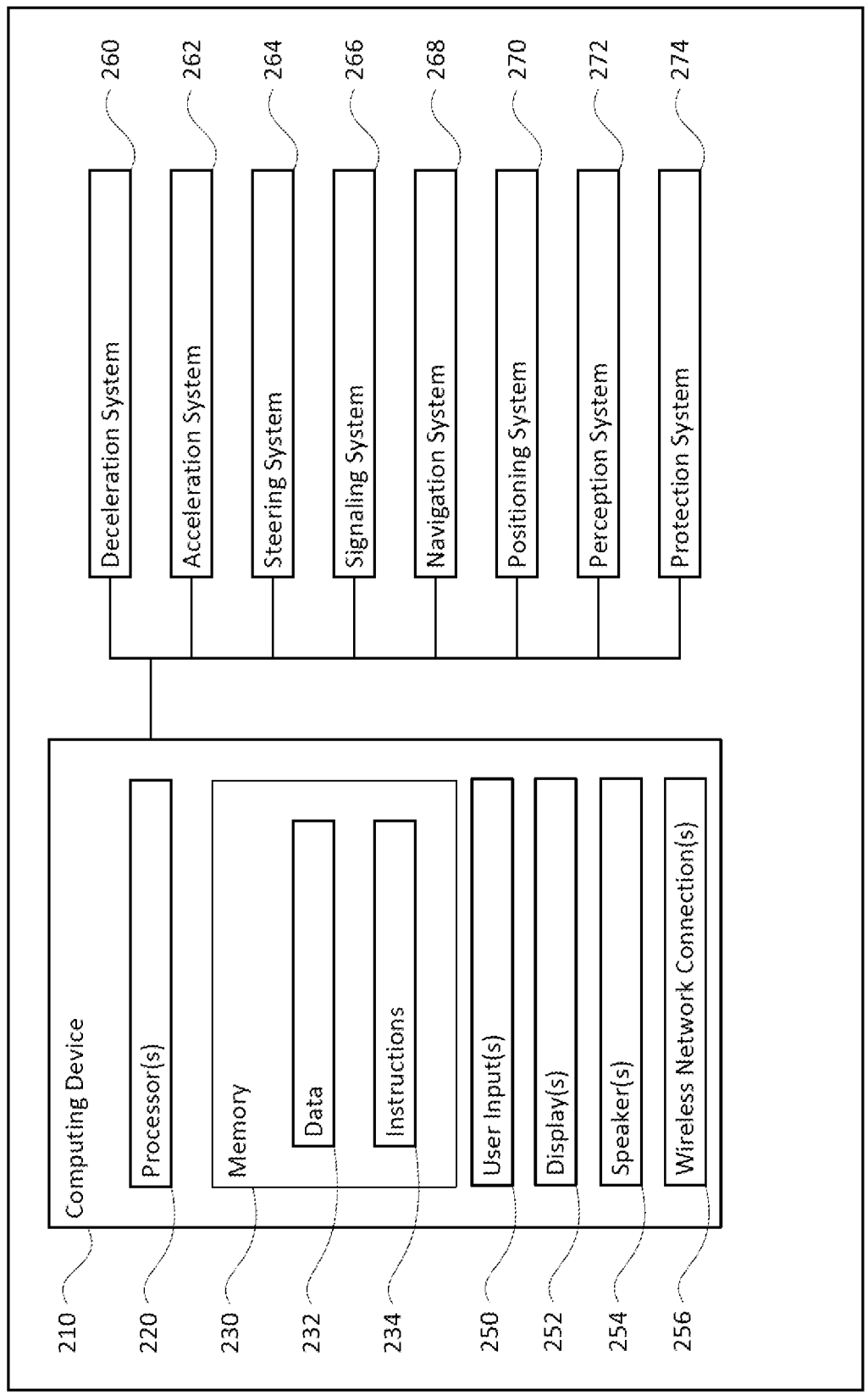
FIG. 2 is a functional diagram of an example vehicle in accordance with aspects of the disclosure.

As shown in FIG. 2, a vehicle 201 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing devices 210 containing one or more processors 220, memory 230 and other components typically present in general purpose computing devices.

The memory 230 stores information accessible by the one or more processors 220, including instructions 234 and data 232 that may be executed or otherwise used by the processor 220. The memory 230 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 234 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 232 may be retrieved, stored or modified by processor 220 in accordance with the instructions 234. For instance, although the claimed subject matter is not limited by any particular data structure, the data may be stored in computing device registers, in a relational database as a table having a plurality of different fields and records, XML documents or flat files. The data may also be formatted in any computing device-readable format.

The processor 220 may be any one or more conventional processors, such as commercially available CPUs. Alternatively, the one or more processors may be a dedicated device such as an ASIC or other hardware-based processor. Although FIG. 2 functionally illustrates the processor, memory, and other elements of computing devices 210 as being within the same block, it will be understood by those of ordinary skill in the art that the processor, computing device, or memory may actually include multiple processors, computing devices, or memories that may or may not be stored within the same physical housing. For example, memory 230 may be a hard drive and/or other storage media located in housing different from that of computing device 210. Accordingly, references to a processor or computing device will be understood to include references to a collection of processors or computing devices or memories that may or may not operate in parallel.

Computing device 210 may include all of the components normally used in connection with a computing device such as the processor and memory described above as well as one or more user inputs 250 (e.g., a mouse, keyboard, touch screen and/or microphone) and various electronic displays (e.g., a monitor having a screen or any other electrical device that is operable to display information). In this example, the vehicle includes one or more internal displays 252 as well as one or more speakers 254 to provide information or audio visual experiences. In this regard, display 252 may be located within a cabin of vehicle 201 and may be used by computing device 210 to provide information to passengers or maintenance personnel within or otherwise in the vicinity of, the vehicle 201.

Computing device 210 may also include one or more wireless network connections 256 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, Wi-Fi and HTTP, and various combinations of the foregoing. Computing device 210 of vehicle 201 may also receive or transfer information to and from other computing devices (not shown), such as computing devices which contain or otherwise store further map or perception data.

In one example, computing device 210 may control the computing devices of an autonomous driving computing system incorporated into vehicle 201. The autonomous driving computing system may capable of communicating with various components of the vehicle in order to control the movement of vehicle 201 according to primary vehicle control code stored in memory 230. For example, computing device 210 may be in communication with various systems of vehicle 201, such as deceleration system 260, acceleration system 262, steering system 264, signaling system 266, navigation system 268, positioning system 270, perception system 272, and power system 274 (i.e. the vehicle's engine or motor) in order to control the movement, speed, etc. of vehicle 201 in accordance with the instructions 234 of memory 230. Again, although these systems are shown as external to computing device 210, in actuality, these systems may also be incorporated into computing device 210, again as an autonomous driving computing system for controlling vehicle 201.

As an example, computing device 210 may interact with one or more actuators or other such components of the deceleration system 260 and/or acceleration system 262, such as brakes, accelerator pedal, and/or the engine or motor of the vehicle, in order to control the speed of the vehicle. Similarly, one or more actuators or other such components of the steering system 264, such as a steering wheel, steering shaft, and/or pinion and rack in a rack and pinion system, may be used by computing device 210 in order to control the direction of vehicle 201. For example, if vehicle 201 is configured for use on a road, such as a car or truck, the steering system may include one or more actuators or other such devices to control the angle of wheels to turn the vehicle. Signaling system 266 may be used by computing device 210 in order to signal the vehicle's intent to other drivers or vehicles, for example, by lighting turn signals or brake lights when needed.

Figure 4A:
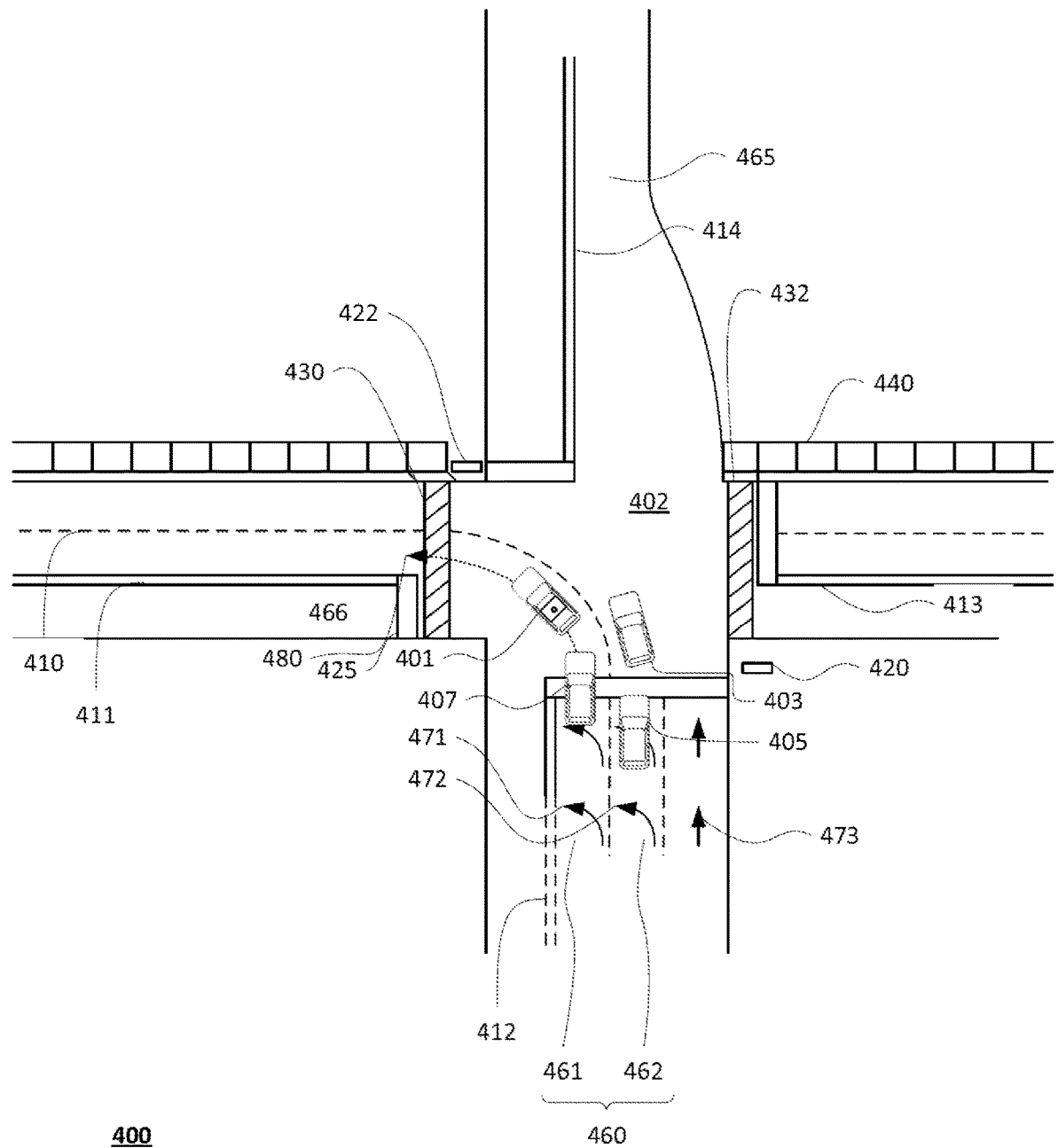
FIGS. 4A and 4B are example views of a section of roadway corresponding to map information on which an autonomous vehicle is traversing in accordance with aspects of the disclosure.

Navigation system 268 may be used by computing device 210 in order to determine and follow a route to a location. In this regard, the navigation system 268 and/or data 232 may store detailed map/roadmap information, e.g., highly detailed maps identifying the shape and elevation of roadways, lane lines, intersections, crosswalks, speed limits, traffic signals, buildings, signs, real time traffic information, vegetation, or other such objects and information. For instance, FIG. 4A shows a portion of roadway 400 illustrating example map information identifying the shape, location, and other characteristics of various road features proximate to intersection 402. In this example, the portion of roadway 400 corresponding to the map information includes information defining the shape and location of lane markers 410-414, stop lines 425, crosswalks 430, 432, sidewalk 440, traffic lights 420, 422, lane markings 471, 472, 473 as well as the shape and direction of traffic for lanes 461, 462, 465, 466, etc. The portion of roadway 400 illustrates a few road features contained in the map information. The map information may also include additional features of the roadway, such as, for instance, lane lines, shoulder areas, an intersection, and lanes and orientations. Map information may also identify various other road features such as stop signs, yield signs, railroad tracks, railroad crossings, speed limit signs, road signs, speed bumps, etc. Although not shown in the portion of roadway 400, the map information may also include information identifying speed limits and other legal traffic requirements, such as which vehicle has the right of way given the location of stop signs or state of traffic signals, etc.

Although the detailed map information corresponding to portion of roadway 400 is depicted herein as an image-based map, the map information need not be entirely image based (for example, raster). For example, the detailed map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 270 may be used by computing device 210 in order to determine the vehicle's relative or absolute position on a map or on the earth. For example, the positioning system 270 may include a GPS receiver to determine the positioning system's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 270 may also include other devices in communication with computing device 210, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 210, other computing devices and combinations of the foregoing.

The perception system 272 may also include one or more components for detecting objects external to the vehicle such as other vehicles, obstacles in the roadway, traffic signals, signs, trees, etc. For example, the perception system 272 may include lasers, sonar, radar, cameras and/or any other detection devices that record data which may be processed by computing device 210. In some instances, the perception system may include a laser or other sensors mounted on the roof or other convenient location of a vehicle. For instance, the perception system 272 may use various sensors, such as LIDAR, sonar, radar, cameras, etc. to detect objects and their characteristics such as location, orientation, size, shape, type, direction and speed of movement, etc. In the case where the vehicle is a passenger vehicle such as a minivan, the minivan may include a laser or other sensors mounted on the roof or other convenient location.

Figure 3:
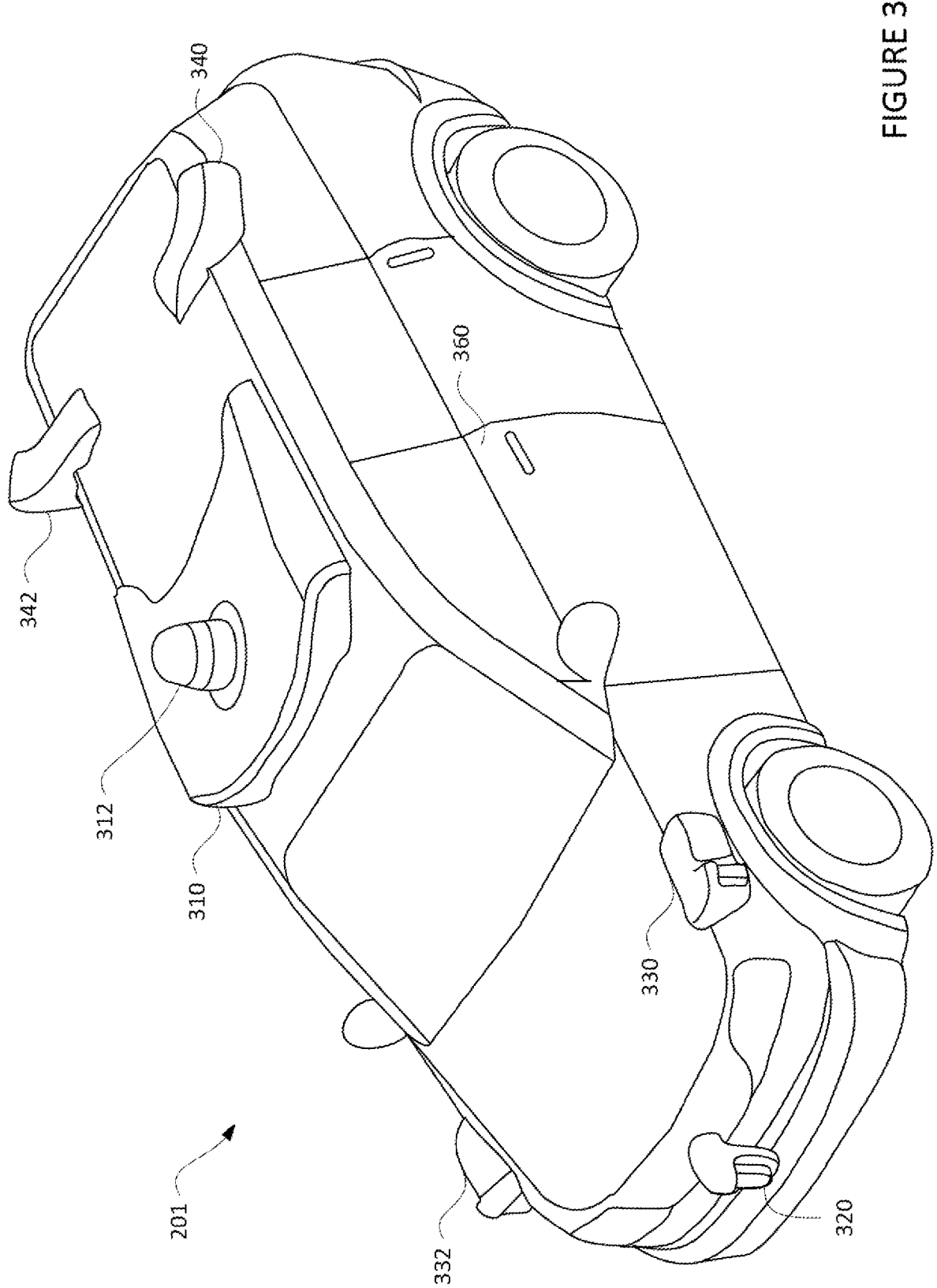
FIG. 3 is an example representative view of a vehicle in accordance with aspects of the disclosure.

For instance, FIG. 3 is an example external view of vehicle 201. In this example, a roof-top sensor housing 310 and a dome sensor housing 312 may include one or more lidar sensors, cameras, and/or radar units. In addition, housing 320 located at the front end of vehicle 201 and housings 330, 332 on the driver's and passenger's sides of the vehicle may each store a lidar sensor. For example, housing 330 is located in front of driver door 360. Vehicle 201 also includes housings 340, 342 for radar units and/or cameras also located on the roof of vehicle 201. Additional radar units and cameras (not shown) may be located at the front and rear ends of vehicle 201 and/or on other positions along the roof or roof-top sensor housing 310. In this regard, each of housings 310, 312, 320, 330, 332, 340, and 342 may be considered sensor housings any or all of the aforementioned sensors may be considered a part of the vehicle's perception system 272.

Based on data received from the various system components, the computing device 210 may control the direction, speed, acceleration, etc. of the autonomous vehicle 201 by sending instructions to the various components of the vehicle. For instance, the computing device may navigate the autonomous vehicle to a destination location completely autonomously using data from the map information and navigation system. The computing device may use the positioning system to determine the autonomous vehicle's location and perception system to detect and respond to objects when needed to reach the location safely. In order to do so, computing devices may cause the autonomous vehicle to accelerate (e.g., by increasing fuel or other energy provided to the engine by acceleration system), decelerate (e.g., by decreasing the fuel supplied to the engine, changing gears, and/or by applying brakes by deceleration system), change direction (e.g., by turning the front or rear wheels of the autonomous vehicle by steering system), and signal such changes (e.g., by lighting turn signals of signaling system). Thus, the acceleration system and deceleration system may be a part of a drivetrain that includes various components between an engine of the autonomous vehicle and the wheels of the autonomous vehicle. Again, by controlling these systems, computing devices 210 may also control the drivetrain of the autonomous vehicle in order to maneuver the vehicle to a destination location completely autonomously using data from the map information and navigation system.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted. It should be further understood that the term autonomous may include semi-autonomous vehicles, including vehicles where a human driver may take over control of the vehicle.

Figure 6:
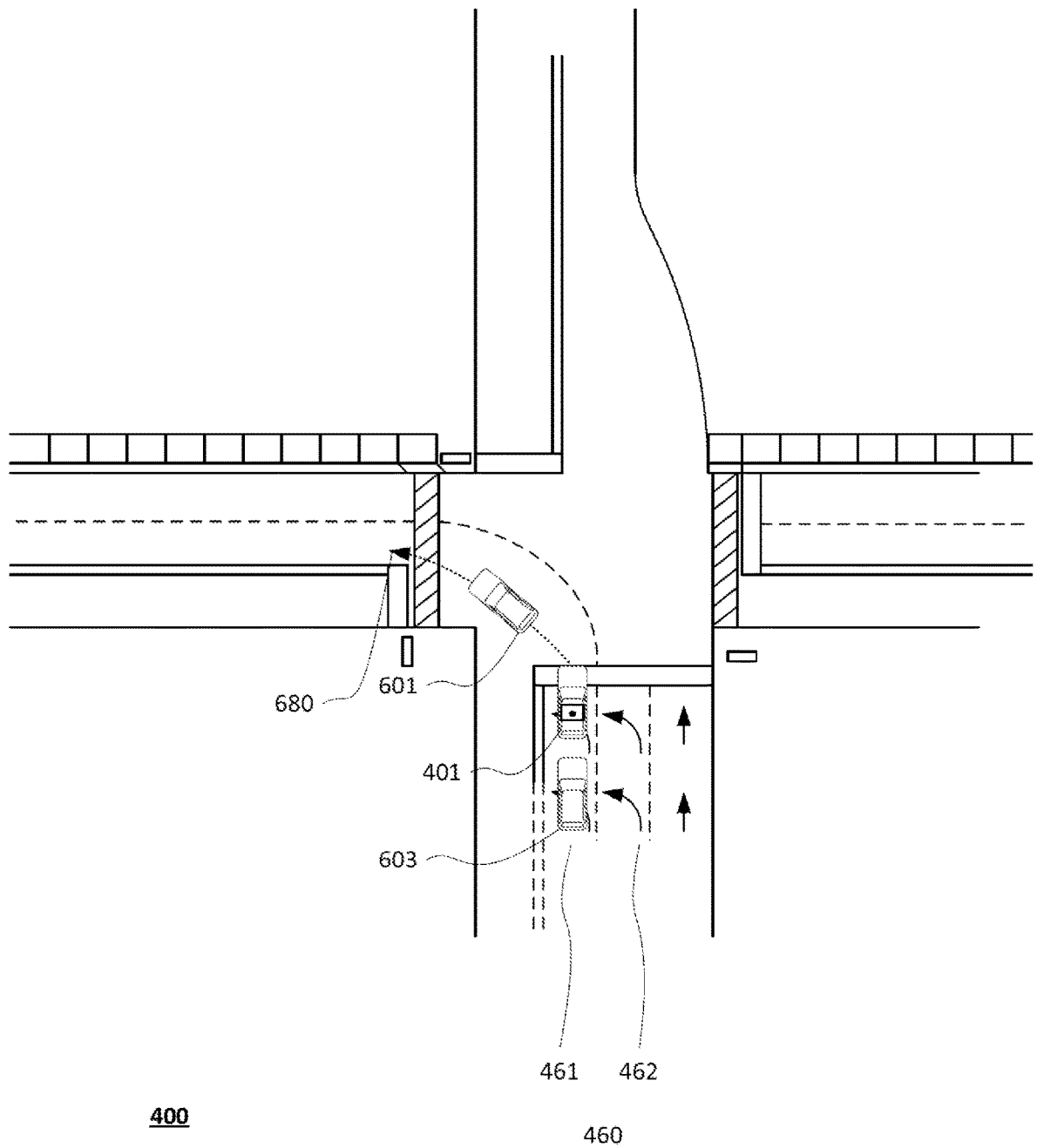
FIG. 6 is an example illustration of an autonomous vehicle following the trajectory of another vehicle in accordance with aspects of the disclosure.
Figure 7:
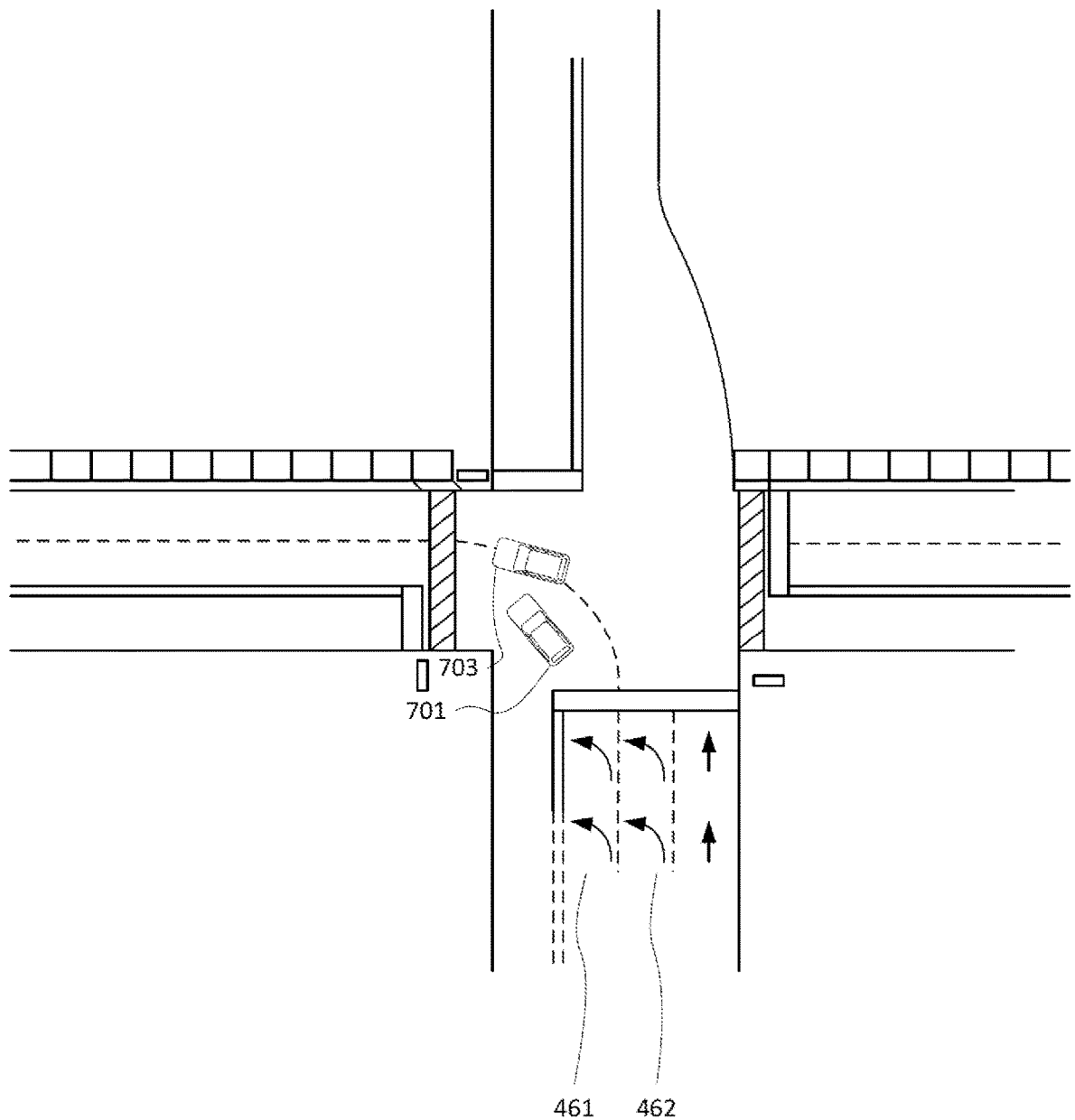
FIG. 7 is an example illustration of two vehicles traversing an intersection in accordance with aspects of the disclosure.

When traversing a multi-lane turn, the autonomous vehicle may be in a number of positions relative to the other vehicles. For instance, the autonomous vehicle 401, which may be compared to vehicle 201, may be the first vehicle in a line of vehicles, as shown in FIG. 4A, or the autonomous vehicle 401 may be in the middle or the back of a line of vehicles, as shown in FIGS. 6 and 7, respectively. Although the examples described herein show an autonomous vehicle 401 traversing a double lane left turn 460, the features described herein may be applied to any multi-lane turn. For instance, the features may be used in a triple lane left turn, double lane right turn, triple lane right turn, a straight section of a multi-lane road where one or more offsets and/or displacements are present, such as an intersection entrance, exit location, on-ramp, off-ramp, or other such road sections having multiple lanes.

Depending upon the position of the autonomous vehicle relative to other vehicles traversing the multi-lane turn, the trajectory of the autonomous vehicle may be adjusted. For instance, and as illustrated on the portion of roadway 400 in FIGS. 4A and 4B, an autonomous vehicle 401 is at the front of the line of vehicles, including vehicle 407 in double left turn lane 460. When positioned at the front of the line of vehicles (e.g., the first vehicle), the autonomous vehicle may travel a nominal trajectory 480, such as if it was making a single lane turn, as shown in FIG. 4A. In other words, the autonomous vehicle's computing device, such as computing device 210, may instruct the autonomous vehicle 401 to travel within its normal operating parameters or rather, to follow a nominal trajectory, such that the autonomous vehicle is centered or nearly centered in the turning lane, in accordance with typical driving practices.

Historical data corresponding to previous paths the autonomous vehicle or other vehicles have traversed around multi-lane turns may be monitored and used to alter the autonomous vehicle's nominal trajectory. In this regard, the past trajectories, such as the actual paths traveled by the vehicles or actual paths traveled by the vehicles relative to a nominal driving corridor defined in the map information (i.e., a portion of the road through which vehicles typically travel) may be tracked. Behaviors, such as acceleration and deceleration, of other vehicles or the autonomous vehicle itself may also be tracked. The historical data may be tracked by the autonomous vehicle's sensors, such as the sensors of perception system 272, the sensors of other vehicles, and/or sensors positioned at, or near, the multi-lane turn.

Figure 4B:
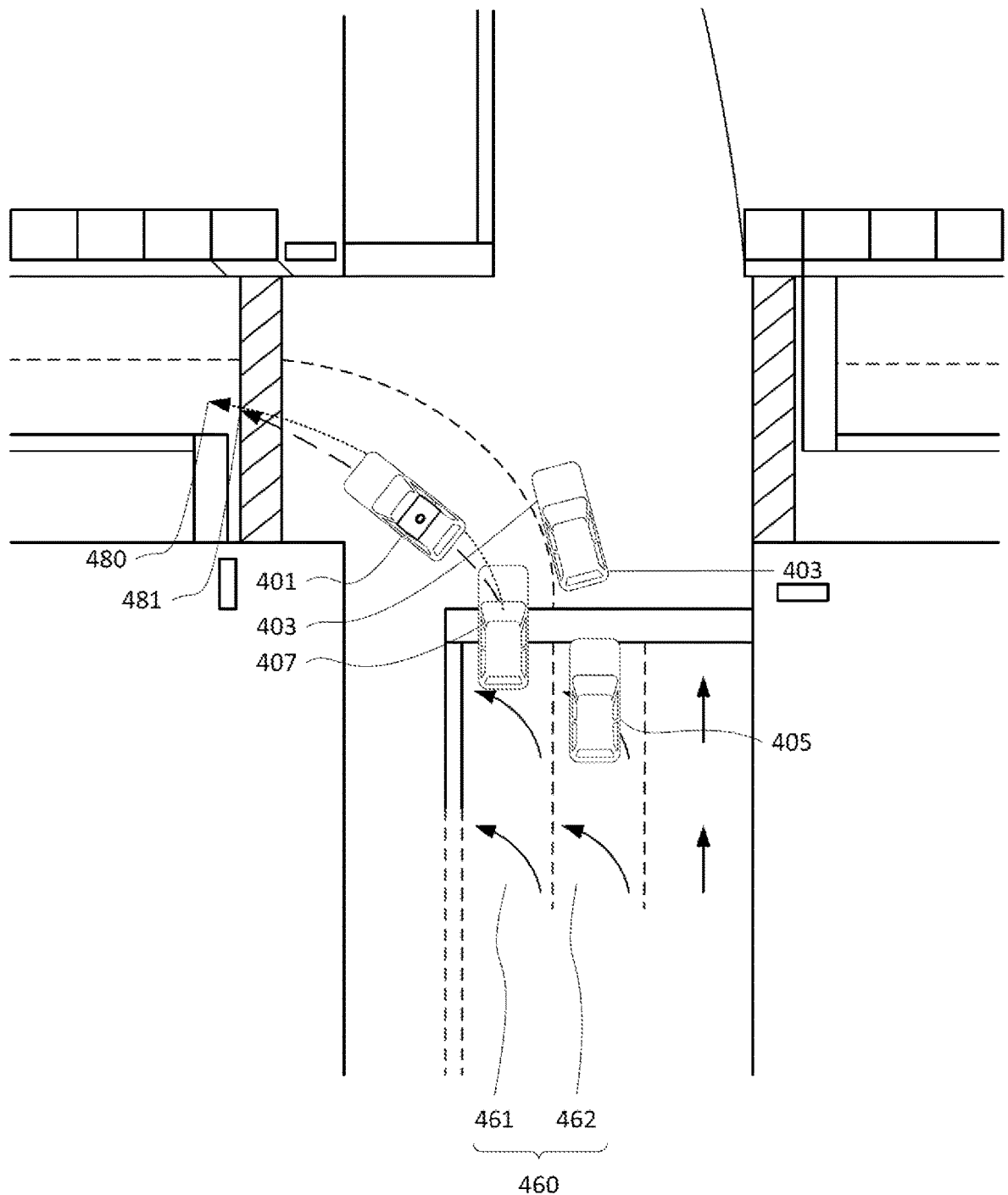

The historical data collected by the sensors may include these previous trajectories of vehicles traversing the inner and outer lanes of a double lane left turn. For instance, and as shown in FIG. 4B, vehicles 403 and 405 in the outside lane 462 of the double lane left turn (i.e., the lane having a wider radius turn) may tend to move towards and/or cut into the inner lane 461 (i.e., the lane having a shorter radius turn). To avoid colliding with the vehicles of the outside lane 462, vehicles traversing the inner lane 461, such as autonomous vehicle 401 and vehicle 407 may typically follow a trajectory which results in a sharper turn than would typically be followed if there were no vehicles in the outside lane 462.

Based on this historical data, the vehicle 402's computing device such as computing device 210, or other such computer, may determine an alternate trajectory should be followed in lieu of the nominal trajectory. In this regard, the trajectory of the autonomous vehicle 401 may be adjusted from its nominal trajectory to an alternate trajectory which more closely resembles the previous trajectories of vehicles traversing the turn. For example, and as previously described, the historical data may indicate that vehicle's travelling in an outside lane 462 tend to move into the inner lane 461 during a turn. Based on the historical data, the computing device 210 may determine an average, lateral displacement of the vehicles traversing the turn relative to the nominal trajectory 480. The autonomous vehicle's nominal trajectory 480 may be adjusted to more closely follow by the average, lateral displacement such that the autonomous vehicle's adjusted trajectory 481 is similar to that of other vehicles, as further shown in FIG. 4B. The trajectory of the autonomous vehicle may be adjusted continuously as the autonomous vehicle traverses the multi-lane turn. The autonomous vehicle's computing devices, such as computing device 210, may then control the autonomous vehicle 401 according to the adjusted trajectory 481. In some instances, the historical data may be filtered prior to determining the average, lateral displacement to remove vehicle trajectories which are more than a predefined distance from the nominal trajectory.

The alternate trajectory may be limited such that the autonomous vehicle does not deviate too far outside of a safe operating trajectory. In this regard, the autonomous vehicle 401 may be bounded by a range in a lateral direction around the trajectory of a turn (i.e., limited to a distance to the left and/or right of the trajectory). For instance, as shown in the map information 500 an unbounded, initial alternate trajectory 580 may be such that it deviates by a certain amount, for instance, two or three feet, or more or less, to the right or left of a nominal trajectory and outside of a range illustrated as "X", which may result in unsafe driving conditions for the autonomous vehicle 401 and/or other surrounding vehicles.

Figure 5:
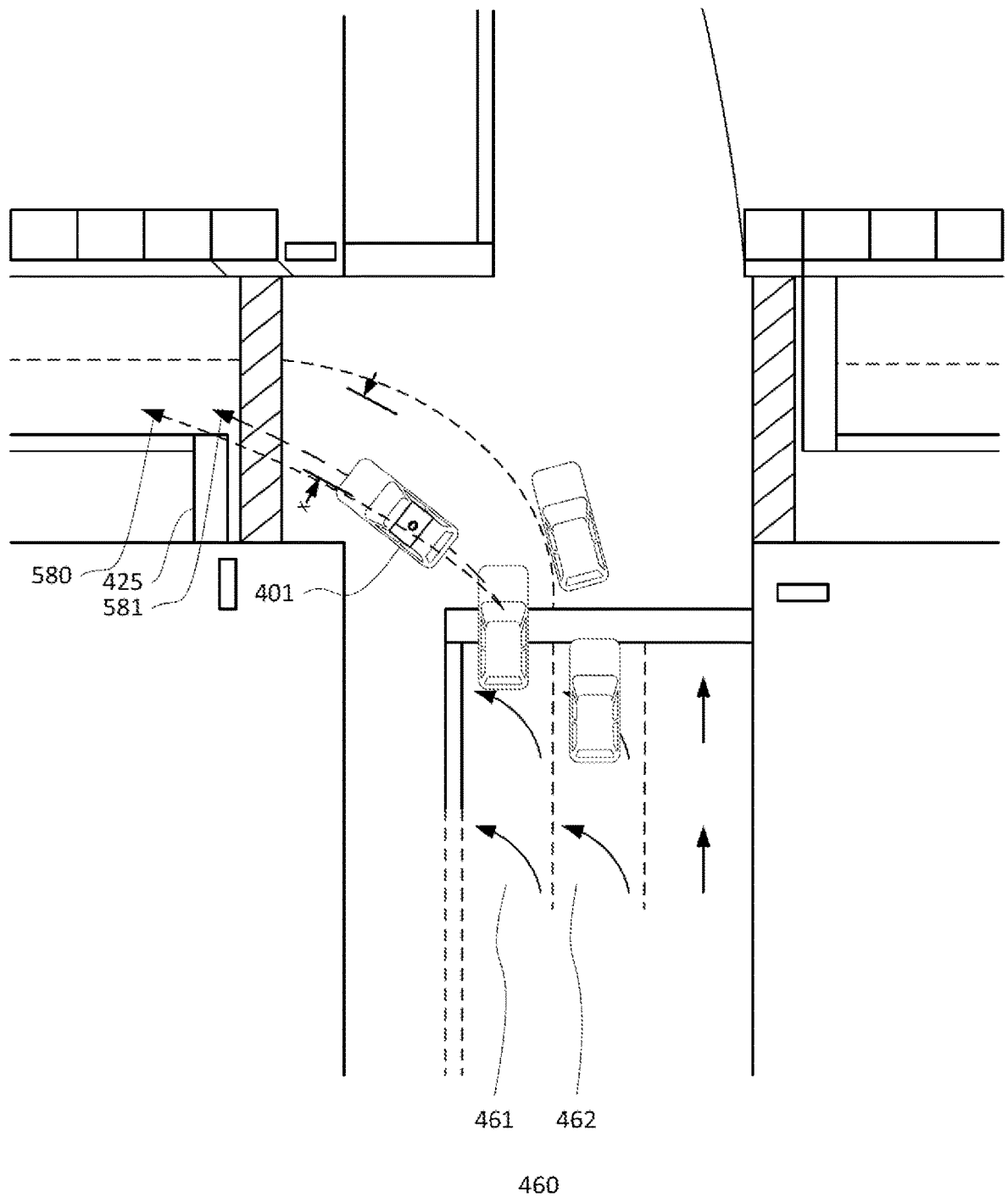
FIG. 5 is an example illustration of an alternate trajectory for an autonomous vehicle in accordance with aspects of the disclosure.

To address this, the initial alternate trajectory 580 may be modified such that it is within the predefined range "X". For example, the unbounded, initial alternate trajectory 580, as shown in FIG. 5, may result in the autonomous vehicle 401 crossing over the stop line 425 of traffic traveling on a lane going in the opposite direction as the autonomous vehicle 401. As vehicles may be positioned on, or past the stop line 425, the initial alternate trajectory 580 may be adjusted such that it is within predefined range "X", as shown by adjusted trajectory 581. The adjusted trajectory 581 may provide sufficient space between the autonomous vehicle 401 and the stop line 425, such that the autonomous vehicle does not travel over the stop line. Other boundaries may be based on the positioning of lane dividers and other such obstacles which may be in the trajectory of the autonomous vehicle.

A confidence interval may be determined for each portion of a turn to determine whether the alternate trajectory is within a certain distance from the nominal trajectory for each portion of the turn. In other words, the confidence interval may be a parameter that can be tuned to provide a trade-off between the autonomous vehicle 401 following the lead vehicle's path, as long as the lead vehicle's path is within an arbitrarily determined range of the nominal path, otherwise the autonomous vehicle may follow its nominal path. In this regard, the turn may be subdivided into a series of fixed, or non-fixed, length intervals. Within every interval, a distribution of potential lateral displacements relative to a nominal trajectory may be observed via the historical data or generated using models. Based on the distributions of displacements, a sample may be generated and assigned an arbitrary confidence interval, such as 95% or more or less. The alternate trajectory may be compared to the sample of displacements to assure the alternate trajectory is within the range of distances, such as 0.5 meters, or more or less, from the nominal trajectory defined by the sample of displacements having the assigned confidence interval.

In instances where the autonomous vehicle is in the middle, or at the end of a line of vehicles, the autonomous vehicle may follow the trajectory of another vehicle or vehicles in front of it. In this regard, the perception system of the autonomous vehicle 402, such as the perception system 272, may track, in real time, the path of the vehicles traversing the same lane of the multi-lane turn as the autonomous vehicle. Based on the path tracked by the perception system, the autonomous vehicle may follow the same, or a similar trajectory. For instance, and as shown in FIG. 6, autonomous vehicle 401 is positioned in the inner lane 461 of double lane left turn 460 between vehicles 601 and 603. The perception system 272 of autonomous vehicle 401 may track the trajectory 680 of vehicle 601 as vehicle 601 traverses lane 461. The autonomous vehicle 401 may then follow the same trajectory 680 as the autonomous vehicle traverses the double lane left turn. In some instances, the trajectory of the autonomous vehicle may be bounded as described herein, such that should the other vehicle's trajectory fall outside of the bounded range, the autonomous vehicle may deviate from the other vehicle's trajectory.

In some instances, vehicles in side-by-side lanes of a multi-lane turn may be positioned too closely together, thereby reducing visibility of other vehicles to drivers of the other vehicles. In common parlance, adjacent vehicles are considered to be in the "blind spot" of the drivers of surrounding vehicles. In such conditions, there is an increased risk that the driver of a vehicle may cross into an adjacent lane, not realizing another vehicle is in his or her blind spot. For instance, and as shown in FIG. 7, vehicle 701 is traversing the inside lane 461 of double lane left turn 460. The driver of vehicle 703, which is positioned adjacent to vehicle 701 (and within a blind spot of vehicle 703) and traversing outer the outer lane 462, may not see vehicle 701 and attempt to cross into the inner lane 461, thereby cutting off vehicle 701.

Figure 8:
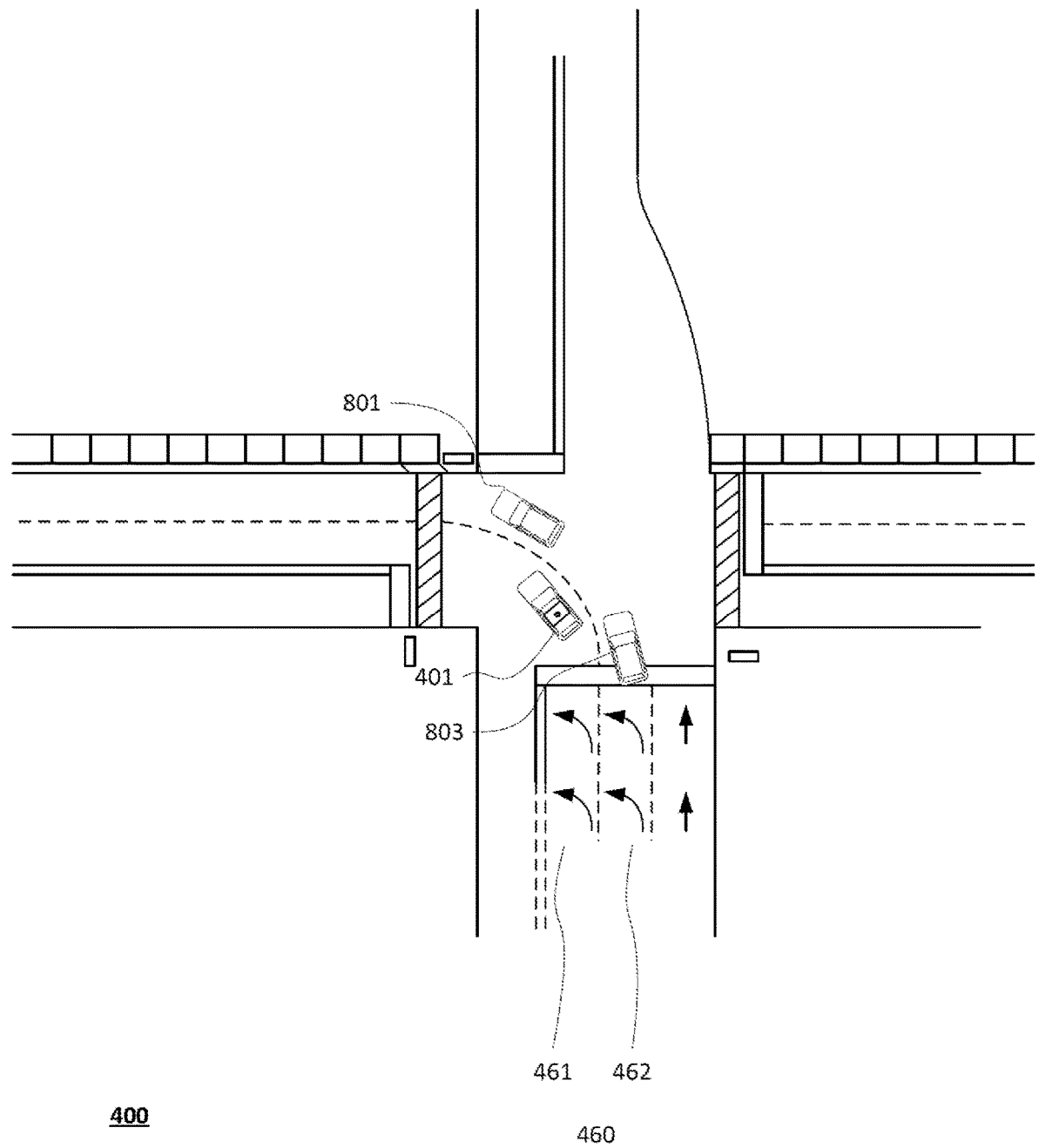
FIG. 8 is an example illustration of staggering an autonomous vehicle relative to surrounding vehicles in accordance with aspects of the disclosure.

To avoid these issues when traversing a multi-lane turn, the autonomous vehicle's computing device may stagger the autonomous vehicle relative to surrounding vehicles. By doing such, the autonomous vehicle may increase visibility to other drivers of the vehicles ahead and behind it. For instance, as shown in FIG. 8, autonomous vehicle 401 is travelling inside lane 461 of the double lane left turn 460 may position itself such that it is between the vehicles 801 and 803 which are traversing the adjacent, outside lane 462. By doing such, the vehicles of the adjacent, outside lane 462 can see the autonomous vehicle 401. Moreover, by staggering the autonomous vehicle 401 relative to the vehicles of the adjacent, outside lane 462, less actuation, such as through braking and/or accelerating, may be required to avoid a collision.

The autonomous vehicle's computing device may continually adjust the trajectory and positioning of the autonomous vehicle relative to the positions of the surrounding vehicles in an adjacent lane. In this regard, the autonomous vehicle's perception system, such as perception system 272 may track the positions of the surrounding vehicles in front of (forward surrounding) and behind (rear surrounding) the autonomous vehicle 401 to determine their position relative to the autonomous vehicle 401. The distance the autonomous vehicle 401 may maintain between a rear surrounding vehicle and a forward surrounding vehicle may be based on fixed stop ranges. For instance, and referring to FIG. 6, the front bumper of the autonomous vehicle 401 may be one meter, or more or less, from the rear bumper of a vehicle 601, which is positioned in front of the autonomous vehicle. For surrounding vehicles behind the autonomous vehicle, such as vehicle 603, the rear bumper of the autonomous vehicle 401 may be one meter from the front bumper of the surrounding vehicle 603.

Figure 9:
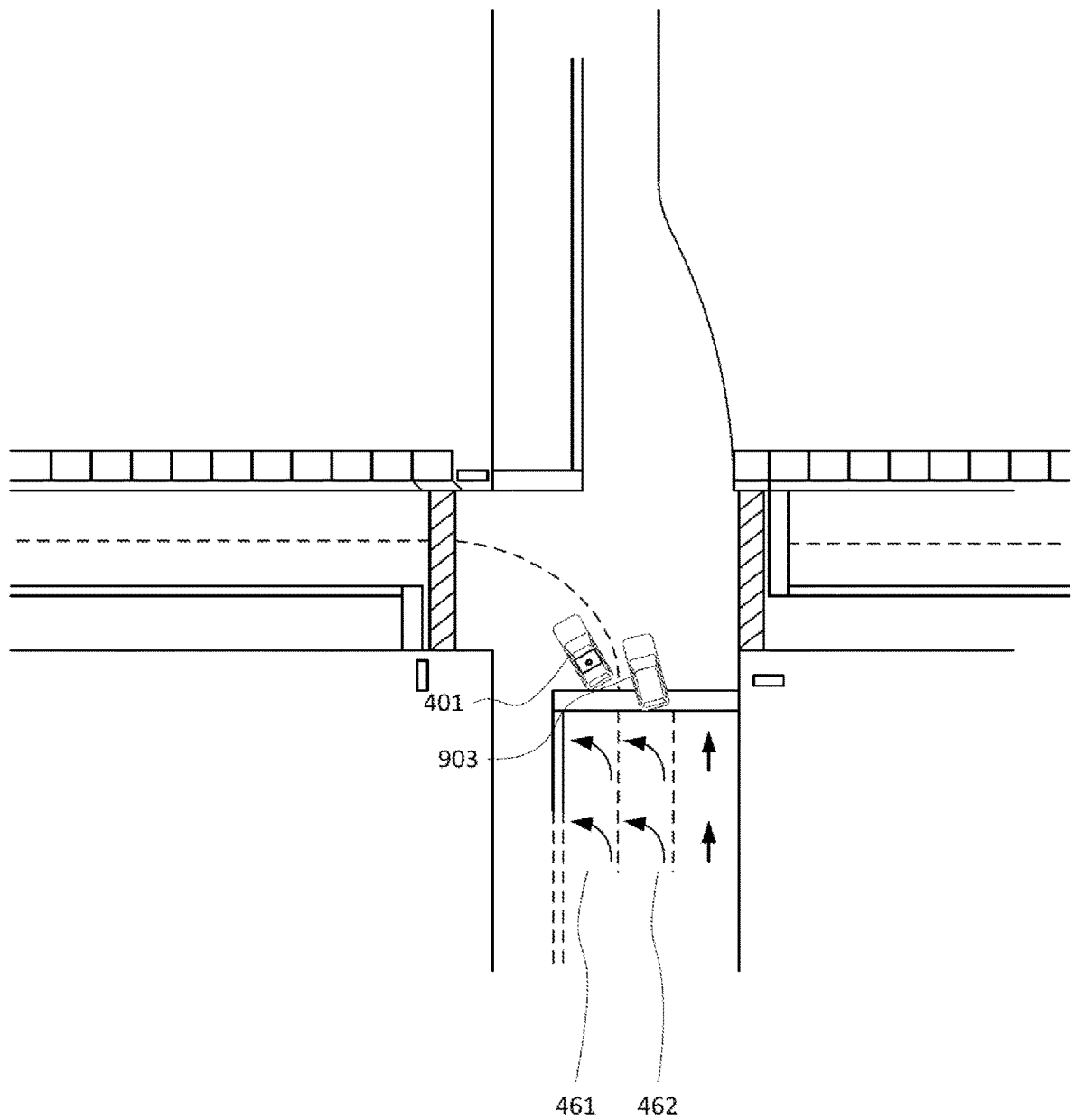
FIG. 9 is an example illustration of an autonomous vehicle traveling too closely to a surrounding vehicle in accordance with aspects of the disclosure.

Based on the distance between the rear surrounding vehicle and the forward surrounding vehicle, the autonomous vehicle's computing device may adjust the autonomous vehicle's velocity and/or acceleration to maintain a staggered position. For instance, when the autonomous vehicle 401, traversing the inner lane of double left turn lane 460, is too close to the rear, surrounding vehicle 903 traversing the adjacent, outer lane 462, as shown in FIG. 9, the autonomous vehicle's computing device, such as computing device 210, may cause the autonomous vehicle 401 to accelerate and increase its velocity until appropriate distance between the rear surrounding vehicle is reached.

Figure 10:
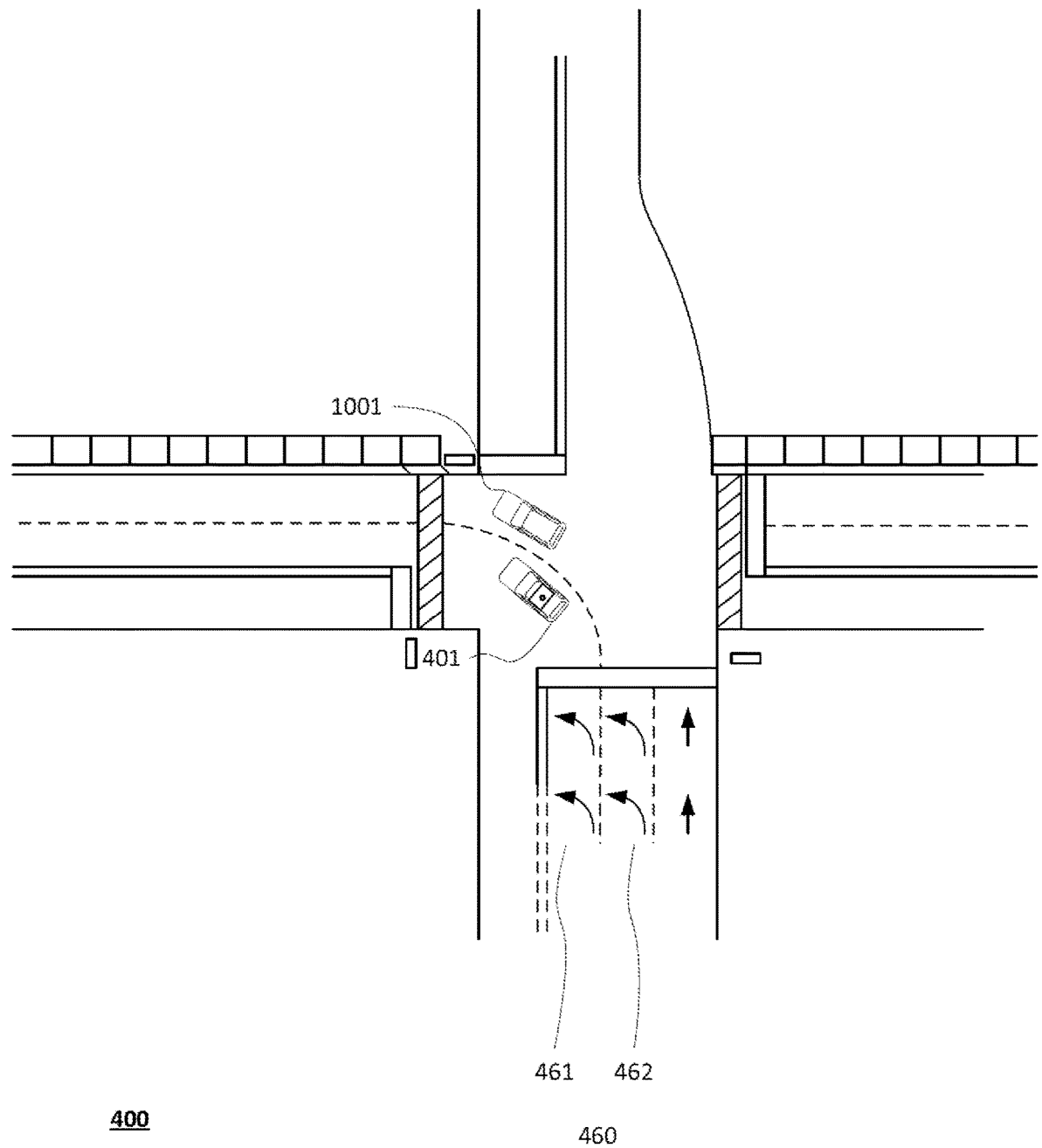
FIG. 10 is an example illustration of an autonomous vehicle traveling too closely to a surrounding vehicle in accordance with aspects of the disclosure.

In instances where the autonomous vehicle is positioned too close to the forward surrounding vehicle the computing device of the autonomous vehicle may decrease the autonomous vehicle's velocity and/or reduce acceleration to allow the forward surrounding vehicle time to pull further ahead of the autonomous vehicle. For instance, when the autonomous vehicle 401, traversing the inner lane of double left turn lane 460, is too close to the forward, surrounding vehicle 1001, as shown in FIG. 10, the autonomous vehicle's computing device, such as computing device 210, may cause the autonomous vehicle 401 to decelerate and decrease its velocity until appropriate distance between the forward surrounding vehicle 1001 is reached.

In the event there is appropriate spacing between the forward and rear surrounding vehicles is reached, the computing devices of the autonomous vehicle may maintain the autonomous vehicle's current velocity and/or acceleration.

Figure 11:
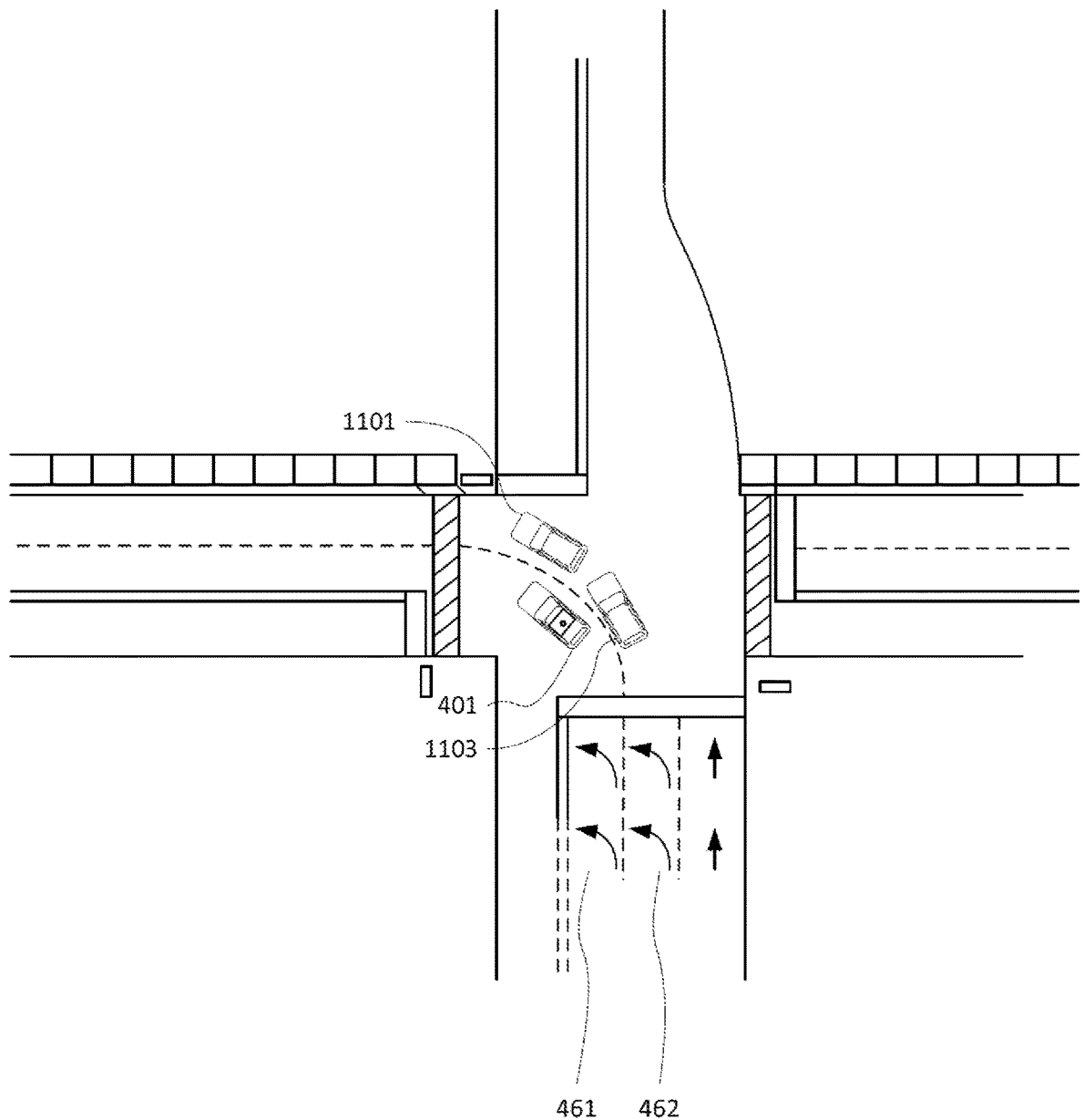
FIG. 11 is an example illustration of an autonomous vehicle traveling too closely to surrounding vehicles in accordance with aspects of the disclosure.

In some instances, forward and/or rear surrounding vehicles may prevent the autonomous vehicle from staggering. In this regard, the forward and/or rear surrounding vehicles may be positioned too closely together to allow the autonomous vehicle to stagger. In such a situation, the autonomous vehicle may either pass or yield to one of the surrounding vehicles. For instance, and as shown in FIG. 11, the rear surrounding vehicle 1103 traveling in the outside lane 462 of double left turn lane 460 is too close to the front surrounding vehicle 1101 to allow the autonomous vehicle to stagger. In response, the autonomous vehicle 401, which is traversing the inside lane 461, may either yield to the rear surrounding vehicle 1103 by decreasing the vehicle's velocity and/or acceleration in order to allow the rear surrounding vehicle to pass (e.g., the rear surrounding vehicle maneuvers into a location ahead of the autonomous vehicle) or pass the forward surrounding vehicle 1101 (e.g., the autonomous vehicle moves into a location ahead of the forward surrounding vehicle) by increasing the vehicle's velocity and/or acceleration.

The determination whether to pass or yield may be based on passenger comfort levels. In this regard, the computing device, such as computing device 210, may monitor the angular trajectory of the autonomous vehicle, its current velocity, its current acceleration, and its position relative to surrounding vehicles. Based on these factors, the computing device may determine whether the autonomous vehicle would be more comfortable to a passenger if the vehicle were to pass a forward surrounding vehicle or if the vehicle were to yield to the rear surrounding vehicle, as it can be disconcerting to a passenger if the autonomous vehicle comes too close to another vehicle laterally and/or if the autonomous vehicle takes a turn too fast or too slow. For instance, an autonomous vehicle may monitor factors such as headway between vehicles ahead and/or behind it, lateral separation distance between surrounding vehicles, braking actions of surrounding vehicles, etc. Based on these factors, and their potential or actual effects on the operation of the vehicle, the autonomous vehicle's computing device may determine whether a passenger would be more comfortable to pass a surrounding vehicle, yield to a surrounding vehicle, or maintain the autonomous vehicle's current position.

Figure 12:
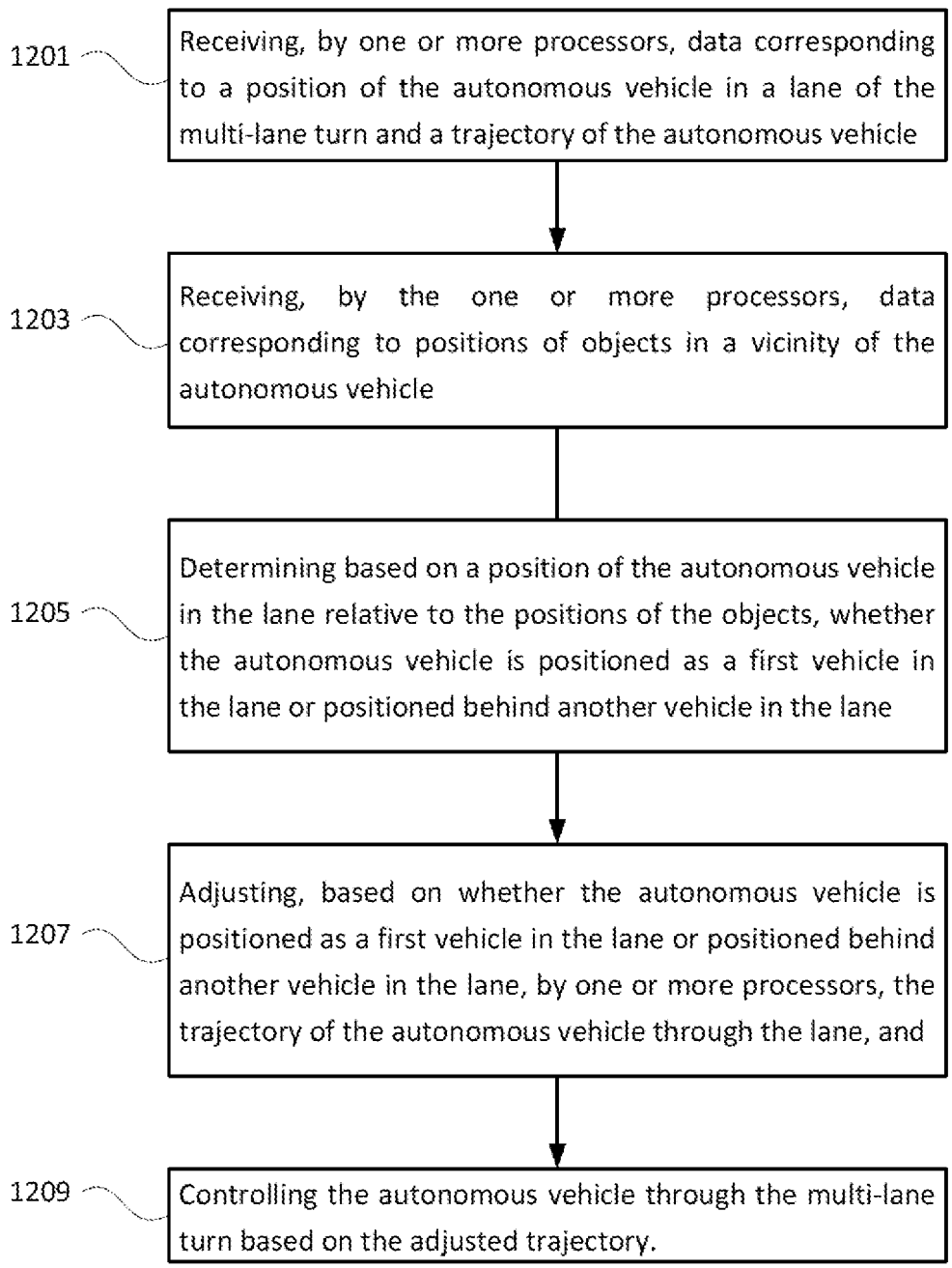
FIG. 12 is a flow diagram in accordance with aspects of the disclosure.

FIG. 12 includes an example flow diagram 1200 of some of the examples for controlling a vehicle as described above. In this example, the steps of flow diagram may be performed by one or more processors of one or more computing devices, such as processors 220 of computing devices 210 of vehicle 201. For instance at block 1201, one or more processors receive data corresponding to a position of the autonomous vehicle in a lane of the multi-lane turn and a trajectory of the autonomous vehicle. At block 1203, one or more processors receive data corresponding to positions of objects in a vicinity of the autonomous vehicle. At block 1205, a determination is made based on a position of the autonomous vehicle in the lane relative to the positions of the objects, whether the autonomous vehicle is positioned as a first vehicle in the lane or positioned behind another vehicle in the lane. The trajectory of the autonomous vehicle through the lane may be adjusted by one or more processors based on whether the autonomous vehicle is positioned as a first vehicle in the lane or positioned behind another vehicle in the lane, as shown in block 1207. The autonomous vehicle may be controlled through the multi-lane turn based on the adjusted trajectory, as shown in block 1209.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for controlling an autonomous vehicle through a multi-lane turn, the method comprising:
   receiving, by one or more processors, data corresponding to a position of the autonomous vehicle relative to a position of each of a first vehicle and a second vehicle in a lane of the multi-lane turn and a trajectory of the autonomous vehicle;
   determining, based on the position of the autonomous vehicle relative to the position of each of the first and second vehicles, that the autonomous vehicle is positioned in an inside lane of the multi-lane turn and the first and second vehicles are positioned in an adjacent lane from the inside lane;
   determining, by the one or more processors, a distance between the autonomous vehicle and each of the first and second vehicles for the autonomous vehicle to be in a staggered position relative to the first and second vehicles such that the first vehicle being a forward surrounding vehicle and the second vehicle being a rear surrounding vehicle;
   adjusting, by the one or more processors, the trajectory of the autonomous vehicle based on the distances to maintain the staggered position; and
   controlling the autonomous vehicle through the multi-lane turn based on the adjusted trajectory.

2. The method of claim 1, wherein the distance is maintained based on a fixed stop range.

3. The method of claim 2, wherein, when the autonomous vehicle is within the fixed stop range of the second vehicle, the autonomous vehicle accelerates and increases its velocity until an appropriate distance between the second vehicle and the autonomous vehicle is reached.

4. The method of claim 2, wherein, the autonomous vehicle is within the fixed stop range of the first vehicle, the autonomous vehicle decelerates and decrease its velocity until an appropriate distance between the first vehicle and the autonomous vehicle is reached.

5. The method of claim 1, wherein velocity and acceleration of the autonomous vehicle are adjusted to maintain the staggered position of the autonomous vehicle relative to each of the first and second vehicles.

6. The method of claim 5, wherein the velocity and acceleration of the autonomous vehicle are adjusted based on the distance between the autonomous vehicle and each of the first and second vehicles.

7. The method of claim 1, wherein adjusting the trajectory of the autonomous vehicle occurs continuously through the multi-lane turn.

8. The method of claim 1, wherein a trajectory of each of the first and second vehicles is tracked by imaging sensors on the autonomous vehicle.

9. The method of claim 1, wherein adjusting the trajectory of the autonomous vehicle maintains the staggered position relative to each of the first and second vehicles as the autonomous vehicle traverses through the multi-lane turn.

10. A system for controlling an autonomous vehicle through a multi-lane turn, the system comprising:
    one or more processors, wherein the one or more processors are configured to:
    receive data corresponding to a position of the autonomous vehicle relative to a position of each of a first vehicle and a second vehicle in a lane of the multi-lane turn and a trajectory of the autonomous vehicle;
    determine, based on the position of the autonomous vehicle relative to the position of each of the first and second vehicles, that the autonomous vehicle is positioned in an inside lane of the multi-lane turn and the first and second vehicles are positioned in an adjacent lane from the inside lane;
    determine a distance between the autonomous vehicle and each of the first and second vehicles for the autonomous vehicle to be in a staggered position relative to the first and second vehicles such that the first vehicle being a forward surrounding vehicle and the second vehicle being a rear surrounding vehicle;
    adjust the trajectory of the autonomous vehicle based on the distances to maintain the staggered position; and
    control the autonomous vehicle through the multi-lane turn based on the adjusted trajectory.

11. The system of claim 10, wherein the distance is maintained based on a fixed stop range.

12. The system of claim 11, wherein, when the autonomous vehicle is within the fixed stop range of the second vehicle, the autonomous vehicle accelerates and increases its velocity until an appropriate distance between the second vehicle and the autonomous vehicle is reached.

13. The system of claim 11, wherein, when the autonomous vehicle is within the fixed stop range of the first vehicle, the autonomous vehicle decelerates and decrease its velocity until an appropriate distance between the first vehicle and the autonomous vehicle is reached.

14. The system of claim 10, wherein velocity and acceleration of the autonomous vehicle are adjusted to maintain the staggered position of the autonomous vehicle relative to each of the first and second vehicles.

15. The system of claim 14, wherein the velocity and acceleration of the autonomous vehicle are adjusted based on the distance between the autonomous vehicle and each of the first and second vehicles.

16. The system of claim 10, wherein adjusting the trajectory of the autonomous vehicle occurs continuously through the multi-lane turn.

17. The system of claim 10, wherein a trajectory of each of the first and second vehicles is tracked by imaging sensors on the autonomous vehicle.

18. The system of claim 10, wherein adjusting the trajectory of the autonomous vehicle maintains the staggered position relative to each of the first and second vehicles as the autonomous vehicle traverses through the multi-lane turn.

\* \* \* \* \*